United States Patent [19]

Riddle

[11] Patent Number: 5,039,745

[45] Date of Patent: Aug. 13, 1991

[54] PAINT COMPOSITION

[75] Inventor: Robert Riddle, Westbury, N.Y.

[73] Assignee: Creative Urethane Concepts, Inc., Westbury, N.Y.

[21] Appl. No.: 410,107

[22] Filed: Sep. 20, 1989

[51] Int. Cl.$^5$ .............................................. C08L 27/18
[52] U.S. Cl. .................................... 525/101; 525/104; 525/131; 427/387
[58] Field of Search ....................... 525/101, 104, 131; 427/387

[56] References Cited

U.S. PATENT DOCUMENTS

| | | | |
|---|---|---|---|
| 2,976,257 | 3/1961 | Dawe et al. | 525/104 |
| 3,642,936 | 2/1972 | Hodge et al. | 525/101 |
| 3,670,049 | 6/1972 | Stein et al. | 525/101 |
| 3,992,347 | 11/1976 | Vary | 525/104 |
| 4,861,667 | 8/1989 | Takayanagi | 428/421 |

FOREIGN PATENT DOCUMENTS 60-223860 11/1985 Japan .................................... 525/101

Primary Examiner—John C. Bleutge
Assistant Examiner—R. Dean, Jr.
Attorney, Agent, or Firm—Collard, Roe & Galgano

[57] ABSTRACT

The present invention relates to a paint composition which contains a silicone resin, a polytetrafluoroethylene polymer, and a polyurethane polymer in combination. The paint composition is useful as a surface coating that can be repeatedly cleaned with strong solvents and which possesses a non-stick surface.

10 Claims, No Drawings

PAINT COMPOSITION

BACKGROUND OF THE INVENTION

1. Field of the Invention

The present invention relates to a paint composition which contains a silicone resin, a polytetrafluoroethylene polymer, and a polyurethane polymer in combination. The paint composition is useful as a surface coating that can be repeatedly cleaned with strong solvents and which possesses a non-stick surface.

2. The Prior Art

In large metropolitan areas, such as urban centers, equipment that is constantly used by the general public, such as telephones, are sometimes vandalized by being sprayed with chemicals and discolored with graffiti. This vandalism not only causes the appearance of the equipment to be undesirable, due to vulgarity, but also the chemicals used by the vandals may be harmful to those members of the public that may touch and use the equipment.

In addition there are other situations wherein undesirable self-stick labels are applied to surfaces of the equipment. During the time these labels are present on the surface, graffiti may be also written on blank portions of the label.

Attempts have been made in the past to overcome these problems. Prior proposed solutions are as follows.

It was desired to provide a paint formulation that could be repeatedly cleaned and from which self-stick labels could be readily removed.

Thus, many combinations of ingredients were prepared to develop this type of surface but to no avail. For example, attempts to develop a non-stick surface were by adding silicone alone to the paint. Many different types of silicones were tested, but it was found that the silicones detracted from the properties of the paint, without giving a non-stick surface, or the paint had a very oily surface that was completely unacceptable.

Then it was decided to add to the paint, tiny plastic particles such as "Hercuflat" brand polypropylene beads. This made the paint surface very bumpy and easy to scratch. Also it was decided to add flourocarbons ("Teflon") to the paint. This gave a non-stick surface, but the paint was very easily removed and scratched off. It is known that "Konar 500" process uses fluorocarbons a paint process, and then bakes the paint at very high temperatures to cause the fluorocarbon to melt and to reharden as part of the paint. This prior art process is unsuitable because it is desired to paint plastic parts, rather than metal parts. Many plastic parts would themselves melt at temperatures high enough to melt the fluorocarbon. It was desired to develop an air drying paint system that could be used on a production line at room temperature and drying in a few minutes for easy handling purposes.

OBJECTS OF THE INVENTION

It is an object of the present invention to provide a paint composition that is capable of protecting an equipment surface from graffiti due to the application of spray paint, marker pens, nail polish, etc., and from self-stick labels placed on the equipment surface.

It is another object of the present invention to provide a paint formulation that could be easily cleaned of graffiti, repeatedly with strong solvents, but wherein the painted surface on the equipment, would not be damaged and also have a non-stick surface that self-stick labels could not stay on, or could be easily peeled therefrom.

It is a further object of the present invention to provide a paint composition comprising the ingredients:
(a) a silicone resin,
(b) a polytetrafluoroethylene polymer, and
(c) a polyurethane polymer, with said ingredients (a), (b) and (c) optionally being either dissolved or dispersed in a liquid carrier.

These and other objects of the present invention will become more apparent as the description thereof proceeds.

SUMMARY OF THE INVENTION

The present invention provides a paint composition that has the following advantages. The paint composition is capable of protecting an equipment surface from graffiti caused by the application of paint, markers, pens, or nail polish, and from self-stick labels placed on the equipment surface. The applied and dried paint can be easily cleaned of graffiti repeatedly with strong solvents, but the painted surface on the equipment would not be damaged, and also have a non-stick surface that self-stick labels will not stay on, or can be easily removed and peeled therefrom. The paint formulation is a composition that is air drying and which can be used in a production line and dried at low temperatures, such as room temperature, in a short time.

Therefore, the present invention is directed to a paint composition comprising the ingredients:
(a) a silicone resin,
(b) a polytetrafluoroethylene polymer, and
(c) a polyurethane polymer, with these ingredients (a), (b) and (c) optionally being either dissolved or dispersed in liquid carrier.

The present invention is also directed to a method for protecting a substrate surface from graffiti or other unwanted markings thereon, comprising
coating said surface with a paint comprising the ingredients:
(a) a silicone resin;
(b) a polytetrafluoroethyene polymer; and
(c) a polyurethane polymer; with said ingredients (a), (b) and (c) optionally being either dissolved or dispersed in a liquid carrier.

In other words, these three component ingredients (a), (b), and (c) may together comprise the ingredients which constitute the paint composition. Alternatively these three ingredients, as a concentrate, may be added into a suitable oil-base, or water-base, paint formulation in which these three ingredients would be either dissolved or dispersed. If the ingredients are dissolved, then a solution will result. If the ingredients are dispersed, then a suspension will result.

DETAILED DESCRIPTION OF PREFERRED EMBODIMENTS

It has now been found that the combination of a silicone resin with a polytetrafluoroethylene polymer in a paint containing a polyurethane polymer produces a paint formulation having a non-stick surface that can be cleaned repeatedly with strong solvents.

*Hackh's Chemical Dictionary*, Fourth Edition, edited by Julius Grant, McGraw-Hill, (1972), page 485, defines "paint", as follows. An oil-base paint is a suspension of finely ground pigment (usually a white pigment such as white zinc oxide) with added colored pigments, if required, in a vehicle or liquid carrier, such as linseed oil, varnish, or turpentine. A water-base paint is an aqueous mixture of pigment and an adhesive such as casein.

Oil base paints may also contain minor amounts of known plasticiyers, driers and extenders. Water-base paints may also contain minor amounts of known emulsifiers, stabilizers and antifoam agents.

In addition, this combination of (a), (b) and (c) above may be added into a paint formulation which may be either oil-base, or may be water-base, depending upon the application or the surface intended to be coated.

The silicone resin is a known material. One example of a suitable source of silicone resin is that found in the Dow Corning product 1-2577 which contains about 76% by weight of silicone resin as the active ingredient, which is useful in the present invention. The silicone polymer is dissolved in the inert solvent toluene which comprises 20% by weight of the 1-2577, with the balance being methyl trimethoxysilane, an inert stabilizer.

In the product 1-2577, the silicone polymer ingredient is the compound dimethyl-methylphenyl-methoxy silicone polymer. The product 1-2577 has the characteristics of being an elastoplastic silicone resin with good dielectric properties, good weatherability, plus resistance to ultraviolet light and dirt and having high moisture resistance, and excellent light transmission.

The polytetrafluoroethylene (PTFE) polymer is a known material. One example of a suitable source of PTFE polymer is that found in the Dupont product polytetrafluoroethylene $(CF_2)_n$ sold as DLX-6000 having an inherent density of 2.3, a melting temperature range of 320° C. to 340° C. and a particle powder size less than 1 micron, and which is useful in the present invention.

The polyurethene resin is a known material. A suitable source for this can be found in prepared paint formulations that already contain the polyurethane resin, such as Glidden brand aliphatic urethane formulation. These are known to contain catalyzed polyurethane resins that have been polymerized to a sufficient extent and yet are soluble in the liquid carrier, or which can be dispersed in the liquid carrier. The preferred polyurethane resin material would be the reaction product of a polyetherpolyol, such as polypropylene glycol ether, with an aliphatic diisocyanate such as an alkyl diisocyanate wherein the alkyl has from 1 to 6 carbon atoms which may be straight or branched chain.

The ranges of the ingredients are as follows. For the silicone resin, the final paint composition would contain from 340 gm to 736 gm (12 oz. to 26 oz.) of silicone resin per 3622 gm (128 oz.) of catalyzed urethane to have a non-stick surface, and the preferred amount is 453 gm (16 oz.). This corresponds to a weight percent range of from about 9% to about 20%, with 11% to 15% being preferred. The range of from 9% to 20% is capable of giving enough non-stick without becoming too oily.

For the PTFE resin, the final paint composition would contain from 3 grams to 21 grams per 3622 gm (128 ounces) of catalyzed urethane, but the preferred amount is 7 grams of PTFE per 3622 gm (128 oz.) of catalyzed urethane material. This corresponds to a weight percent range of from about 0.1% to 1.0%, desirably from 0.1% to 0.5% and preferably from 0.2% to 0.4%.

Because of the property possessed by the PTFE polymer to remain on the surface of the painted material and not to drift back into the paint, this assures that the non-stick properties remain on the surface of the painted product by using the combination of the silicone resin and the PTFE polymer together. When blended with the polyurethene and applied to the substrate surface, the silicone, as well as the PTFE, rises to the top of the paint as it cures causing a very chemical resistant and non-stick top layer. The properties of the PTFE locking together with the silicone and interlocking with the polyurethane resin assures that this non-stick surface remains on the top layers of the cured paint. It also provides a very graffiti-proof surface by preventing the graffiti from becoming part of, or impregnating into the painted surface. Thus it is very easy to clean away and to remove the graffiti.

Hence a preferred paint formulation according to the invention would be composed of an ingredient mixture that includes 453 gm of the silicone resin and 7 grams of tetrafluoroethylene polymer in combination with 3622 gm of polyurethanes.

When the composition of the invention is added to other paints to form a combination formulation, the composition of the invention comprises from 33% to 67% by weight of the total combination, and preferably from 35% to 50% by weight of the total combination.

The present invention will now be further described by reference to the following examples which are not to be deemed limitative of the present invention in any manner thereof.

EXAMPLE 1

A paint composition was formulated by blending together 453 gms (16 oz.) of silicone resin with 7 gm of PTFE polymer. These components ingredients were stirred at room temperature into 3622 gm (i.e.—about 1 fluid gallon or about 128 oz.) of the aliphatic polyurethane, which mixture was then stirred further until a homogeneous paint composition was produced.

EXAMPLE 2

Utilizing a procedure analogous to that described above for Example 1, a paint composition was prepared by adding 340 gm (12 oz.) of the silicone resin and 3 gm of the PTFE polymer to 3622 gm of the polyurethane resin.

EXAMPLE 3

Utilizing a procedure analogous to that described above for Example 1, a paint composition was prepared by adding 736 gms (i.e.—about 26 oz.) of the silicone resin and 21 gms of the PTFE polymer to 3622 gm of the polyurethane resin.

Thorough testing of the paint composition of Example 1 was conducted using A.S.T.M. testing methods to verify that no properties of the paint were lost by adding together these ingredients; and as the test results below show, these ingredients actually enhanced the properties of the paint. The pencil hardness was increased from an H to a 6 H in hardness making the surface layers six times harder. The adhesion test shows acheivement of excellent adhesion, and the highest possible rating of 5B was achieved. Also, the weather resistance and the salt/fog test showed that no negative effects resulted from the testing.

Unless otherwise specified herein, all tests we performed at room ambient temperature and relative humidity, and at normal barometric pressure.

EXAMPLE 4—BENDING TEST

To the paint composition of Example 1 was added 10 to 20 gm of a color pigment known to produce the color specified below (i.e.—white, silver or black). Then the paint was applied to the panel, and allowed to dry in air at room temperature.

The test equipment was a Tinius Olsen Universal Testing Machine LE-495, calibrated 12/7/88.

The test units were three panels:
Panel #1 Painted White,
Panel #2 Painted Silver, and
Panel #3 Painted Black.

During the test procedure, the test samples were subjected to a compression load and bent 180° around a ⅜ diameter ram. The results are as follows:

| Sample Identification | Remarks |
|---|---|
| Panel #1 painted white | Satisfactory, no cracks |
| Panel #2 painted silver | Satisfactory, no cracks |
| Panel #3 painted black | Satisfactory, no cracks |

EXAMPLE 5—Adhesion Test

To the paint composition of Example 1 was added 10 to 20 gm of a color pigment known to produce the color specified below. Then the paint was applied to each panel, and allowed to air dry at room temperature.

The test procedure is described in ASTM D-3359, Method B.

The test equipment was "Scotch" brand tape 610.

The test units were three Panels:
Panel #1 Painted White
Panel #2 Painted Silver
Panel #3 Painted Black During the test procedures, the test samples were tested in accordance with ASTM D-3359 Method B Scotch 610 Tape. The adhesion was rated using the following visually applied criterion:

5B: The edges of the cuts are completely smooth: none of the squares of the lattice is detached.
4B: Small flakes of the coating are detached at intersections; less than 5% of the area is affected.
3B: Small flakes of the coating are detached along edges and at intersections of cuts. The area affected is 5 to 15% of the lattice.
2B: The coating has flaked along the edges and on parts of the squares. The area affected is 15 to 35% of the lattice.
1B: The coating has flaked along the edges of cuts in large ribbons and whole squares have detached. The area affected is 35 to 65% of the lattice.
0B: Flaking and detachment worse than Grade 1.

The test results were as follows:

| Sample Identification | Classification |
|---|---|
| Panel #1 painted White | 5B* |
| Panel #2 painted Silver | 5B* |
| Panel #3 painted Black | 5B* |

*Note: 5B is designated as the best results for this testing.

EXAMPLE 6—PENCIL HARDNESS TEST

To the paint composition of Example 1 was added 10 to 20 gm of a color pigment known to produce the color specified below. Then the paint was applied to each panel, and allowed to air dry at room temperature.

The test procedure is described in ASTM D-3363.
The test equipment was Calibrated Wood Pencils.
The test units were three Panels:
Panel #1 Painted White
Panel #2 Painted Silver
Panel #3 Painted Black During the test procedure the submitted samples were subjected to a pencil hardness test in accordance with ASTM D3363. Calibrated wood pencils meeting the following scale of hardness were used:

| 6B-5B-4B-3B-2B-B | HB-F-H-2H-3H-4H-5H-6H |
|---|---|
| Softer | Harder |

The test results were as follows:

| Sample Identification | Pencil Hardness |
|---|---|
| Panel #1 Painted White | 6H |
| Panel #2 Painted Silver | 6H |
| Panel #3 Painted Black | 6H |

EXAMPLE 7—SALT SPRAY TEST

To the paint composition of Example 1 was added 10 to 20 gm of a color pigment known to produce the color specified below. Then the paint was applied to each panel, and allowed to air dry at room temperature.

The test procedure is described in ASTM B117.
The test equipment was a Salt Spray Chamber, LE-1538
The test units were three Panels:
Panel #1 Painted White
Panel #2 Painted Silver
Panel #3 Painted Black During the test procedures, the test panels were placed in the salt fog chamber with their significant surface approximately 15° C. from the vertical and subjected to a 5% salt solution fog for a period of 500 hours. During the exposure period, the chamber temperature was maintained at 95° F. and a pH between 6.5 and 7.2. Following the 500 hour exposure period, the test units were removed from the chamber, blown dry with clean unheated air and visually inspected.

The test results were as follows:

There was no visual evidence of physical damage to the painted surfaces of the test panels. Corrosion was noted on the unpainted surfaces of the test panel.

For a comparison test, the Glidden Aliphatic Urethane formulation was also tested. The comparative test results are presented below in Table I.

TABLE 1

| ASTM | Prior Art Glidden Test Results | Example 1 Invention |
|---|---|---|
| D3363 | 1 - Pencil Hardness - H | 6H six times harder |
| B117 | 2 - Salt/Fog - several #6 and #8 Size Blisters | No Effect |
| LE-495 | 3 - T-bend - No cracking | No cracking |
| D3359 METHOD B | 4 - Adhesion - NOT TESTED | 5B - HIGHEST RATING |

EXAMPLE 8—GRAFFITI REMOVAL TEST

The paint composition of Example 1 (white color) was applied to coat the surface of a steel plate, and allowed to air dry at room temperature. Then permanent red magic marker fluid was applied to the dried white paint in various manners, such as to create words, symbols and designs on to the paint. The applied red magic marker fluid was permitted to dry onto the paint at room temperature. A soft cotton cloth saturated with methylethylketone (100% by weight MEK) was then wiped across the painted surface. After two wipes, the dried red magic marker was completely removed and cleaned from the painted surface.

The same soft cotton cloth saturated with MEK was then wiped across the cleaned painted surface an additional 200 times, but none of the paint was removed from the surface by the MEK.

This example shows that the applied and dried paint can be easily cleaned of graffiti repeatedly with strong solvents, but the painted surface itself is not damaged by the strong solvents.

Based upon the above test results, it can be concluded that the paint composition of the invention was a superior paint by itself, or it would enhance and make superior the properties of any paints to which it was added. It increased the pencil hardness six times and increased the chemical resistance. All self-stick labels could be easily peeled off or will just weather off, if outside.

Even though the present invention has been described by reference to a few embodiments thereof, it is not intended that it be so limited; instead the present invention is only to be defined by the scope of the following claims.

What is claimed is:

1. A paint composition to be applied to a substrate surface comprising the ingredients:
   (a) a silicone resin;
   (b) a polytetrafluoroethylene polymer; and
   (c) a polyurethane polymer;
   the silicone resin of (a) comprises from about 9% to about 20% by weight based upon the polyurethane polymer;
   the polytetrafluoroethylene polymer of (b) comprises from about 0.1% to 1% by weight based upon the polyurethane polymer;
   the balance up to 100% by weight is comprised by the polyurethane polymer; and
   wherein the combination of the silicone resin and the polytetrafluoroethyelene polymer together, when blended with the polyurethene and applied to the substrate surface, the silicone, as well as the polytetrafluoroethyelene polymer, rises to the top of the paint as it cures creating a very chemical resistant and non-stick top layer.

2. The composition of claim 1, additionally comprising a liquid carrier in which said paint composition is dissolved or dispersed, and wherein the composition of claim 1 comprises from 33% to 67% by weight of the total weight, and
   wherein the liquid carrier comprises the balance up to 100% by weight.

3. The composition of claim 1, wherein
   the silicone resin of (a) comprises from about 11% to about 15% by weight based upon the polyurethane polymer; the polytetrafluoroethylene polymer of (b) comprises from about 0.1% to 1% by weight based upon the polyurethane polymer; and
   the balance up to 100% by weight is comprised by the polyurethane polymer.

4. The composition of claim 1, wherein
   the silicone resin of (a) comprises from about 9% to about 20% by weight based upon the polyurethane polymer;
   the polytetrafluoroethylene polymer of (b) comprises from about 0.1% to 0.5% by weight based upon the polyurethane polymer; and
   the balance up to 100% by weight is comprised by the polyurethane polymer.

5. The composition of claim 1, wherein
   the silicone resin of (a) comprises from about 9% to about 20% by weight based upon the polyurethane polymer;
   the polytetrafluoroethylene polymer of (b) comprises from about 0.2% to 0.4% by weight based upon the polyurethane polymer; and
   the balance up to 100% by weight is comprised by the polyurethane polymer.

6. A method for protecting a substrate surface from graffiti or other unwanted markings thereon, comprising
   coating said surface with a paint composition comprising the ingredients:
   (a) a silicone resin;
   (b) a polytetrafluoroethyene polymer; and
   (c) a polyurethane polymer;
   the silicone resin of (a) comprises from about 9% to about 20% by weight based upon the polyurethane polymer;
   the polytetrafluoroethylene polymer of (b) comprises from about 0.1% to 1% by weight based upon the polyurethane polymer;
   the balance up to 100% by weight is comprised by the polyurethane polymer; and
   wherein the combination of the silicone resin and the polytetrafluoroethylene polymer together, when blended with the polyurethene and applied to the substrate surface, the silicone, as well as the polytetrafluoroethylene polymer, rises to the top of the paint as it cures creating a very chemical resistant and non-stick top layer.

7. The method of claim 6, additionally comprising a liquid carrier in which said paint composition is dissolved or dispersed, and wherein the composition of claim 1 comprises from 33% to 67% by weight of the total weight, and
   wherein the liquid carrier comprises the balance up to 100% by weight.

8. The method of claim 6, wherein the silicone resin of (a) comprises from about 11% to about 15% by weight based upon the polyurethane polymer;
   the polytetrafluoroethylene polymer of (b) comprises from about 0.1% to 1% by weight based upon the polyurethane polymer; and
   the balance up to 100% by weight is comprised by the polyurethane polymer.

9. The method of claim 6, wherein the silicone resin of (a) comprises from about 9% to about 20% by weight based upon the polyurethane polymer;
   the polytetrafluoroethylene polymer of (b) comprises from about 0.1% to 0.5% by weight based upon the polyurethane polymer; and
   the balance up to 100% by weight is comprised by the polyurethane polymer.

10. The method of claim 6, wherein the silicone resin of (a) comprises from about 9% to about 20% by weight based upon the polyurethane polymer;
    the polytetrafluoroethylene polymer of (b) comprises from about 0.2% to 0.4% by weight based upon the polyurethane polymer; and
    the balance up to 100% by weight is comprised by the polyurethane polymer.

* * * * *